United States Patent [19]

Maeda et al.

[11] 3,966,681

[45] June 29, 1976

[54] PROCESS FOR THE PREPARATION OF UNSATURATED POLYURETHANE RESINS

[75] Inventors: Hiroshi Maeda, Chiba; Nagao Ariga; Takeo Matuo, both of Ichihara, all of Japan

[73] Assignee: Dainippon Ink and Chemicals, Incorporated, Tokyo, Japan

[22] Filed: Jan. 13, 1975

[21] Appl. No.: 540,393

Related U.S. Application Data

[63] Continuation of Ser. No. 409,381, Oct. 25, 1973, abandoned.

[30] Foreign Application Priority Data

Oct. 31, 1972    Japan............................... 47-108514

[52] U.S. Cl. ..................... 260/75 NH; 260/31.8 J; 260/77.5 CR; 260/77.5 AP; 260/77.5 AN; 260/859 R
[51] Int. Cl.$^2$ ................. C08G 18/42; C08G 18/04; C08G 18/58
[58] Field of Search .............. 260/77.5 CR, 77.5 SS, 260/77.5 AP, 31.8 J, 77.5 NH

[56] References Cited

UNITED STATES PATENTS 3,478,126    11/1969    Turpin .................................. 26/835

*Primary Examiner*—H.S. Cockeram
*Attorney, Agent, or Firm*—Sherman & Shalloway

[57] ABSTRACT

A process for preparing an unsaturated polyurethane resin containing two or more unsaturated monobasic acid residues in its molecular structure which comprises reacting, in the presence of a polymerizable vinyl monomer, (A) a diesterified product of an epoxy compound containing a hydroxyl group, said product obtained by reacting an epoxy compound having two epoxy groups in its molecular structure but not containing a hydroxyl group with unsaturated monobasic acid, with (B) a diisocyanate compound in the presence or absence of (C) oligopolyester glycol containing a saturated or unsaturated dibasic acid group, at the rate of 0.2 to 1.0 mole of the isocyanate group per each mole of said hydroxyl group.

3 Claims, No Drawings

PROCESS FOR THE PREPARATION OF UNSATURATED POLYURETHANE RESINS

This is a continuation, of application Ser. No. 409,381, filed Oct. 25, 1973, now abandoned.

This invention relates to a process for the preparation of a novel and useful unsaturated polyurethane resin. More specifically, the invention relates to a process for preparing an unsaturated polyurethane which can provide cross-linked cured products excelling not only in resistance to attack by chemicals as well as mechanical properties but also having a high heat distortion temperature, as well as to a process for preparing a commercially valuable unsaturated polyurethane resin providing a resinous solution having a highly improved storage stability.

It has been known hitherto to react either acrylic acid or methacrylic acid with an epoxy compound having in its molecular structure one or more epoxy groups to obtain a compound having one or more acrylic or methacrylic groups in its molecular structure.

However, most of the commercial epoxy resins are those having epoxy groups at both ends of the molecular structure, with the consequence that the compounds obtained by only the reaction of an epoxy group and either acrylic or methacrylic acid, such as hereinabove described, are merely oligomers having two acrylic or methacrylic groups at most in the molecule. Moreover, for the purpose of obtaining a resin having a higher molecular weight, an attempt has been made to increase the unsaturated bonds in the molecular structure of the desired resin by esterification by reacting these oligomers further with a saturated or an unsaturated dibasic acid. In this reaction, however, undesirable side reactions were caused by residual epoxy groups in these oligomers, such as a ring-opening etherification between the hydroxyl group and the epoxy group existing in these oligomers and subsequently branching esterification between the hydroxyl group and carboxyl group in the aforementioned dibasic acid occured to cause gelling to take place during these reactions or those products of which the solubility in the polymerizable vinyl monomers was low could be obtained. In consequence, even in the case of the cured products thereof it was possible only to obtain those of limited performance with respect to such properties as chemical resistance, heat resistance and mechanical properties.

The object of the present invention resides in improving on the these shortcomings of the prior art.

We found that the unsaturated polyurethane resin obtained by the reaction of an ester compound of a specified epoxy compound and an unsaturated monobasic acid (unsaturated epoxy ester) with a diisocyanate compound in a polymerizable vinyl monomer in the presence or absence of an oligopolyester glycol containing a saturated or unsaturated dibasic acid group (hereinafter referred to as "oligoglycol") readily polymerizes with the foregoing polymerizable vinyl monomer at room temperature or under heating or by exposure to energy rays to provide a cross-linked cured product having high chemical resistance and, heat resistance as well as an exceedingly high heat distortion temperature and hence is suitable for such purposes as molding, laminating and lining. We further found that when a monoalkyl ester of an unsaturated dibasic acid was added to a polymerizable monomeric solution of this unsaturated polyurethane resin at the time of the completion of the urethanation reaction, a resinous solution having a highly improved storage stability could be obtained.

Accordingly, there is provided according to the present invention a process for the preparation of a polymerizable vinyl monomer solution of an unsaturated polyurethane resin, which comprises the reaction of (A) an unsaturated epoxy ester, an ester of an epoxy compound having two epoxy groups in its molecular structure but not containing a hydroxyl group and an unsaturated monobasic acid, with (B) a diisocyanate in a polymerizable vinyl monomer in the presence or absence. of (C) an oligopolyester glycol containing a saturated or unsaturated dibasic acid, as well as a process for the preparation of a polymerizable vinyl monomer solution of an unsaturated polyurethane resin having a highly improved storage stability which comprises adding (D) a monoalkyl ester of an unsaturated dibasic acid to said resinous solution subsequent to the completion of said urethane reaction.

In general, the unsaturated polyester resins provide cured products possessing relatively excellent properties, and moreover these resins possess good workability. Hence, the unsaturated polyester resins find wide use. On the other hand, the unsaturated polyurethane resins obtained from the unsaturated polyesters having a urethane bond in their molecular structures are known to possess still more improved chemical resistance and solvent resistance as well as improved mechanical properties. In carrying out the preparation of this type of unsaturated polyurethane resin, it is necessary to carry out the reaction with a diisocyanate after thoroughly diluting the unsaturated polyester with a polymerizable vinyl monomer that is inert to isocyanates such as a styrene monomer. However, in the case of a reaction at high concentrations, the formation of such as the allophanate bonds, for example result from side reactions because of the high reactivity of the isocyanates, with the consequence that the danger of gelation increases results of the abrupt rise of the viscosity of the system. Further, if a polymerization of the double bonds takes place during this urethane reaction, gelation will take place at once. Hence, consideration must be given to the matter of preventing the polymerization reaction.

For the purpose of preventing the gelation to take place in preparing the unsaturated polyester resins or during their storage, the usual practice is to add a polymerization inhibitor. As this polymerization inhibitor, the phenolic compounds are usually used. And among these, t-butyl catechol and hydroquinone are especially valued in view of their good solubility and great effectiveness. However, these compounds cannot be added during the preparation of the unsaturated polyurethane resins, the reason being that since these are compounds containing active hydrogen atom, they react with the isocyanate component contained in the system and thus do not show their inherent polymerization inhibiting activity, with the consequence that the storage stability of the resin is markedly decreased. Again, even in the case where the foregoing polymerization inhibitors were added to the unsaturated polyurethane resin after the urethane reaction or during its storage, the storage stability obtained was not necessarily satisfactory as a practical matter.

In consequence of our extensive research with a view to improving the storage stability of such polyurethane resins, we found that this storage stability was dependent upon the acid value of the resinous solution and moreover found that by the use of a monoalkyl ester of an unsaturated dibasic acid not only the storage stability was remarkably improved but also that the properties of the cured product were not degraded.

The aforementioned unsaturated epoxy ester (A) used in the invention process is either a diacrylate or a dimethacrylate of an epoxy compound, which is a reaction product obtained by the esterification reaction between an unsaturated monobasic acid such as acrylic or methacrylic acid and an epoxy compound having two epoxy groups in its molecular structure but not containing a hydroxyl group. And the foregoing epoxy compound is either the diglycidyl ethers or dimethylglycidyl ethers obtained by reacting either an epihalohydrin or beta-methylepihalohydrin with either a dihydric alcohol, a dihydric phenol or a dibasic acid in the presence of an alkaline compound, or the corresponding esters of these diglycidyl ethers or dimethylglycidyl ethers, and denotes those epoxy compounds or alicyclic diepoxy compounds of low molecular weight, which contain substantially no hydroxyl groups.

The esterification reaction between these epoxy compounds and the unsaturated monobasic acids such as acrylic or methacrylic acid is best carried out at a temperature in the range of 60° to 150°C., and preferably 80° to 120°C., at a molar ratio of the epoxy compound to the acid of 1:1 − 1:2.

For achieving a reduction of the reaction time as well as for preventing the setting up of undesirable side reactions such as the ring cleavage and etherification of the epoxy groups, it is a desirable practice in carrying out the reaction to add 0.01 − 1% by weight, based on the reaction mixture, of a tertiary amine or a salt thereof, an inorganic metal salt such as sodium chloride, potassium chloride and lithium chloride, or an organic acid salt such as sodium acetate, potassium acetate and lithium acetate.

Again, the addition during this esterification reaction of a polymerization inhibitor such as hydroquinone and t-butyl catechol in an amount of 50 to 5000 ppm, and preferably 100 to 1000 ppm, for prevention of polymerization is desirable.

In a preferred embodiment of the invention, the so obtained unsaturated epoxy ester (A), a diacrylate or a dimethacrylate of an epoxy compound, is then dissolved in at least one polymerizable vinyl monomer or a mixture of two or more thereof, after which the polyurethane reaction is carried out by adding a diisocyanate compound (B) in the presence or absence of an oligoglycol (C) obtained by reacting 2 − 4 moles of a glycol with 1 − 3 moles of a saturated or an unsaturated dibasic acid.

As the polymerizable vinyl monomer to be used for dissolving the unsaturated epoxy ester (A), mention can be made of the following typical compounds: styrene or its derivatives, the acrylic esters, methacrylic esters, acrylonitrile and methacrylonitrile. The amount in which these polymerizable vinyl monomers are used should be one of the order such that the viscosity of the unsaturated polyurethane solution resulting from the urethane reaction does not adversely affect its workability as well as the properties of the cured product. Usually, a monomer concentration of about 10 − 60% is convenient.

As the glycols to be used in preparing the foregoing oligoglycol (C), mention can be made of such known customarily used glycols as ethylene glycol, propylene glycol, diethylene glycol, triethylene glycol, 1,6-hexanediol and butanediol. On the other hand, the unsaturated dibasic acids denote such known customarily used unsaturated dibasic acids as fumaric acid, maleic acid, maleic anhydride, citraconic acid and itaconic acid. And by saturated dibasic acids is meant such acids as succinic acid, succinic anhydride, adipic acid, sebacic acid, phthalic acid, phthalic anhydride, isophthalic acid and terephthalic acid.

As the foregoing diisocyanate compound (B), included are typically tolylene diisocyanate, 3,3'-bitolylene-4,4'-diisocyanate, diphenylmethane-4,4'-diisocyanate, 3,3'-dimethyldiphenylmethane-4,4'-diisocyanate, metaphenylenediisocyanate, naphthylene-1,5-diisocyanate, hexamethylenediisocyanate, xylylenediisocyanate and 1,4-tetramethylenediisocyanate, or the dimers of these diisocyanates. Further, the addition compounds of these diisocyanates and active hydrogen-containing compounds are also useful as the diisocyanate compound in this invention. As examples of these active hydrogen-containing compounds, included are ethylene glycol, propylene glycol, tetramethylene glycol, neopentyl glycol butanediol, hexanediol-1,6, polyethylene glycol, polypropylene glycol, bisphenol-ethylene oxide adduct, bisphenol-propylene oxide adduct, etc.

These diisocyanate compounds (B) are used in an amount of 0.2 to 1.0 times, calculated as isocyanate groups, based on the hydroxyl groups contained in the reaction system, i.e., at the rate of 0.2 to 1.0 mole of the isocyanate groups per each mole of the hydroxyl groups.

While the urethane reaction is preferably carried out at a temperature of 40° − 100°C., it becomes necessary depending upon the reactivity of the diisocyanate compound used as well as the reactivity of the unsaturated epoxy ester (A) or the hydroxyl group of the oligoglycol (C) used to avoid the rise in temperature due to the reaction proceeding at too fast a rate. To achieve this, it is preferred that the diisocyanate compound is added portionally or is diluted with the aforementioned polymerizable vinyl monomer.

On the other hand, the addition products of the diisocyanates and the various aforementioned active hydrogen-containing compounds may be formed during the urethane reaction. For instance, the aforesaid diacrylate or dimethacrylate (A) derived from epoxy compounds can be mixed with one of the various aforementioned glycols, after which the diisocyanate is added. Alternatively, the intended unsaturated polyurethane resin can be prepared by, for instance, a procedure consisting of adding in the presence of an oligopolyester glycol (C) obtained by the reaction of one of the foregoing glycols with an organic acid such as succinic acid, adipic acid, azelaic acid, sebacic acid, maleic anhydride, fumaric acid or phthalic acid, a diisocyanate compound (B) to the diacrylate or dimethacrylate (A) in a 0.2 to 1.0-fold amount, calculated as isocyanate groups, based on the total hydroxyl groups contained in (C).

The so obtained polymerizable vinyl monomer solution of an unsaturated polyurethane resin of the present invention is useful in such fields as molding, laminate and painting and can be readily cured at room temperature by the addition of a redox catalyst such as cobalt naphthanate-methyl ethyl ketoneperoxide, dimethylaniline-benzoyl peroxide, cobalt naphthanateacetylacetone peroxide, and vanadium naphthanate-methyl ethyl ketone peroxide. Again, it can also be cured by heating at 50° – 150°C. in the case of a peroxide such as benzoyl peroxide, cumene hydroperoxide or ditertiary butyl peroxide being added. The so obtained cured products excel in mechanical as well as electrical properties and moreover possess superior chemical resistance, solvent resistance and an exceedingly high heat distortion temperature.

There are instances in which the acid value of the polymerizable vinyl monomer solution of an unsaturated polyurethane resin obtained in accordance with the present invention drops during the urethane reaction, and hence the desired storage stability cannot be obtained even though a polymerization inhibitor is added. In such a case the storage stability of said resinous solution can be improved by adding the aforementioned monoalkyl ester of an unsaturated dibasic acid (D). The decline in the storage stability ascribable to this drop in the acid value is conceivably due to the following reason. In the case of a system having a high acid value, the polymerization inhibitor that is present together in the system is believed to be stably present, with the consequence that its effects as a radical scavenger is fully demonstrated. On the other hand, in the case where the acid value is low, the polymerization inhibitor is believed to be easily oxidized by the oxygen of the air to result in a decline of the stability of the system in a short period of time. If this seems to be the cause, it seems that the addition along with the polymerization inhibitor of an acidic substance, a carboxylic acid or its ester would serve to enhance the storage stability of the unsaturated polyurethane resin solution whose acid value is low. However, according to our studies, it was found that there was at times rather a drop in the storage stability of the unsaturated polyurethane resin solution and a degradation of the properties of the resulting cured product depending upon the kind of the acidic substance that is added in this case, and that only the monoalkyl esters of the unsaturated dibasic acids (D) were in accord with this purpose.

As the unsaturated dibasic acid, one of the components of the aforesaid monoalkyl ester, mention can be made of such dibasic acids as maleic, fumaric, itaconic and citraconic acids and such acid anhydrides as maleic, itaconic and citraconic anhydrides. As the monohydric alcohol, the other component of the monoalkyl ester, included are the lower aliphatic monohydric alcohols such as methanol, ethanol, isopropanol and butanol.

The monoalkyl esters can be prepared by a dehydroesterification reaction between an equimolar quantity of the foregoing unsaturated dibasic acids and monohydric alcohols. The intended monoalkyl ester is obtained very readily and quantitatively conveniently by a procedure of reacting an equimolar quantity of an acid anhydride with a monohydric alcohol at a low temperature. Hence, from the commercial standpoint the most advantageously useful monoalkyl ester (D) is monomethyl maleate obtained from maleic anhydride and methanol.

Since the storage stability of the unsaturated polyurethane resin solution is poor when its acid value is less than 5, it is necessary to raise its acid value to at least 5, and preferably 10 to 20, by the addition of the aforesaid monoalkyl ester (D). The addition of the monoalkyl ester to the unsaturated polyurethane resin solution is preferably carried out at the time of the completion of the urethane reaction.

The following examples will now be given for more fully illustrating the invention.

REFERENCE EXPERIMENT 1

Preparation of a dimethacrylate of an epoxy compound:

To 210 grams of a bisphenol A-bis(glycidyl)ether type resin synthesized from 1 equivalent of bisphenol A, 5 – 10 equivalents of epichlorohydrin and 1 equivalent of caustic soda (produced by Dainippon Ink & Chemicals, Inc., trade name EPICLON 850, epoxy equivalent = 200) were added 86 grams of methacrylic acid, 200 ppm of hydroquinone and as esterification catalyst 0.1% by weight, based on the total charge, of triethylamine. The mixture was then reacted for about 10 hours at 80°C. with stirring while introducing an inert gas to obtain a dimethacrylate having an acid value of 3. The so obtained dimethacrylate was then dissolved in 200 grams of styrene to obtain a light yellow resinous solution having a viscosity of 50 centipoises.

REFERENCE EXPERIMENT 2

Preparation of a dimethacrylate of an epoxy compound:

To 230 grams of a bisphenol A-bis(2-methylglycidyl) ether type resin synthesized from 1 equivalent of bisphenol A, 5 – 10 equivalents of beta-methylepichlorohydrin and 1 equivalent of caustic soda (produced by the above company, trade name EPICLON MH-8, epoxy equivalent = 220) were added 86 grams of methacrylic acid, 300 ppm of hydroquinone and 0.2% by weight, based on the total charge, of triethylamine. The reaction was then carried out as in Reference Experiment 1 for 15 hours to obtain a dimethacrylate having an acid value of 4.5. The so obtained dimethacrylate was then dissolved in 210 grams of styrene to obtain a light yellow resinous solution having a viscosity of 250 centipoises.

REFERENCE EXPERIMENT 3

Preparation of a dimethacrylate of an epoxy compound:

A neopentyl glycol-bis(2-methylglycidyl)ether type resin synthesized from 1 equivalent of neopentyl glycol, 5 – 10 equivalents of beta-methylepichlorohydrin and 1 equivalent of caustic soda (produced by the above company, trade name EPICLON 720, epoxy equivalent = 130) was used in an amount of 140 grams, and the reaction was carried out for about 15 hours at 100°C. The experiment was otherwise carried out as in Reference Experiment 2 to obtain a dimethacrylate having an acid value of 4. The so obtained dimethacrylate was then dissolved in 160 grams of methyl methacrylate to obtain a dimethacrylate solution having a viscosity of 10 centipoises.

REFERENCE EXPERIMENT 4

Preparation of a diacrylate of an epoxy compound:

To 350 grams of a hexahydrophthalic acid-bis(2-methylglycidyl ether) ester type resin synthesized from 1 equivalent of hexahydrophthalic acid, 5 – 10 equivalents of beta-methylepichlorohydrin and 1 equivalent of caustic soda (produced by the above company, trade name EPICLON 400, epoxy equivalent = 330) were added 72 grams of acrylic acid, 400 ppm of hydroquinone and 0.2% by weight, based on the total charge, of triethylamine. The reaction was then carried out as in Reference Experiment 1 for 20 hours to obtain a diacrylate having an acid value of 5. The so obtained diacrylate was then dissolved in 280 grams of styrene to obtain 700 grams of a styrene solution having an acid value of 6 and a viscosity of 20 centipoises.

REFERENCE EXPERIMENT 5

Preparation of a dimethacrylate of an epoxy compound:

To 460 grams of 3,4-epoxy-6-methylcyclohexyl-3,4-epoxy-6-methylcyclohexane carboxylate (produced by Union Carbide Corporation, trade name UNOX ERL 4201) of an epoxy equivalent of 153 were added 250 grams of methacrylic acid, 250 ppm of hydroquinone and 0.14 gram of potassium chloride, after which the mixture was reacted for 10 hours at 85°C. to obtain a dimethacrylate having an acid value of 5. The so obtained dimethacrylate was then dissolved in 470 grams of styrene to obtain a light yellow resinous solution having a viscosity of 180 centipoises.

REFERENCE EXPERIMENT 6

Preparation of an oligopolyester glycol:

One mole of phthalic anhydride and 2 moles of ethylene glycol were reacted for 5 hours at 200°C. while introducing an inert gas to obtain an oligopolyester glycol of a hydroxyl equivalent of 150 and an acid value of 2.

REFERENCE EXPERIMENT 7

Preparation of an oligopolyester glycol:

One mole of fumaric acid and 2 moles of neopentyl glycol were reacted for 8 hours at 200°C. while introducing an inert gas to obtain an oligopolyester glycol of an acid value of 1.2 and a hydroxyl equivalent of 160.

REFERENCE EXPERIMENT 8

Preparation of a diisocyanate adduct:

After heating 2 moles of tolylene diisocyanate at 40°C., one mole of diethylene glycol was added dropwise thereto during a period of 3 hours. After completion of the dropping, the reaction was carried out for 2 hours at 60°C. to obtain a diethylene glycol-tolylene diisocyanate adduct of an isocyanate equivalent of 220.

REFERENCE EXPERIMENT 9

Preparation of a diisocyanate adduct

Two moles of xylylene diisocyanate was heated at 40°C., following which one mole of dipropylene glycol was added dropwise thereto during a period of 3 hours while cooling the mixture. After completion of the dropping, the mixture was held for another 3 hours at 60°C. to obtain a dipropylene glycolxylylene diisocyanate adduct of an isocyanate equivalent of 251.

REFERENCE EXPERIMENT 10

Preparation of an oligopolyester glycol

One mole of fumaric acid, 2 moles of neopentyl glycol and 200 ppm of hydroquinone were reacted for 8 hours at 200°C. while introducing an inert gas to obtain an oligopolyester glycol of an acid value of 1.2 and a hydroxyl equivalent of 160.

EXAMPLES 1 – 7

Urethane reactions were carried out by adding dropwise with stirring during a period of one hour 60 weight % styrene solutions of the several kinds of diisocyanate compounds indicated in Table 1 to the polymerizable vinyl monomer solutions of a diacrylate or dimethacrylate of an epoxy compound obtained in the Reference Experiments 1 to 5, using a mole ratio of the hydroxyl group to the isocyanate group such as indicated in said table.

The other conditions of the reactions and the properties of the so obtained polymerization vinyl monomer solutions of unsaturated polyurethane resins and the properties of the cured products are shown together in Table 1.

Also shown in Table 1 are the properties of a control sample (bisphenol A modified polyester used).

Table 1

| | EXAMPLE | | | | | | | CONTROL |
| | 1 | 2 | 3 | 4 | 5 | 6 | 7 | bisphenol A modified polyester |
|---|---|---|---|---|---|---|---|---|
| Diacrylate or dimethacrylate component used | Dimethacrylate of Reference Experiment 1 | Dimethacrylate of Reference Experiment 2 | Dimethacrylate of Reference Experiment 3 | Diacrylate of Reference Experiment 4 | Dimethacrylate of Reference Experiment 1 | Dimethacrylate of Reference Experiment 3 | Dimethacrylate of Reference Experiment 5 | |
| Diisocyanate component used | tolylene diisocyanate | tolylene diisocyanate | tolylene diisocyanate | xylylene diisocyanate | xylylene diisocyanate | hexamethylene diisocyanate | hexamethylene diisocyanate | |
| Hydroxyl group/isocyanate mole ratio | 1/0.6 | 1/0.7 | 1/0.8 | 1/0.6 | 1/0.8 | 1/0.6 | 1/0.5 | |
| Reaction temperature (°C.) | 60 | 60 | 50 | 50 | 60 | 70 | 50 | |
| Reaction time (hrs) | 3 | 3 | 4 | 5 | 3 | 2 | 2 | |
| Viscosity of product solution (cps) | 450 | 600 | 1,500 | 450 | 1,200 | 150 | 210 | |
| Gel time of product (min.) | 2–3 | 2–3 | 4 | 1–2 | 2–3 | 5 | 2 | 12 |
| Heat distortion** temperature(°C.) | 142 | 45 | 121 | 134 | 128 | 115 | 138 | 120 |
| Flexurol strength (kg/mm²)** | 14.5 | 14.2 | 10.5 | 15.2 | 15.1 | 16.1 | 12.7 | 9.5 |
| Chemical Resistance** [Swelling rate (%) after 60°C. × 6 hours] | | | | | | | | |
| 20% HCl | −0.02 | −0.03 | −0.01 | 0.21 | 0.09 | −0.02 | −0.01 | −0.07 |
| 20% aq NaCH | 0.06 | 0.06 | 0.05 | 0.10 | 0.02 | 0.08 | 0.05 | 0.97 |
| 25% aq H₂SO₄ | 0.31 | 0.25 | 0.32 | 0.41 | 0.15 | 0.42 | 0.20 | 0.82 |
| Methyl ethyl ketone | 0.81 | 0.91 | 1.20 | 0.08 | 0.21 | 1.01 | 0.40 | 1.30 |
| Styrene | 0.06 | 0.05 | 0.08 | 0.12 | 0.04 | 0.09 | 0.21 | 0.72 |
| 25% aq acetic acid | 0.05 | 0.04 | 0.10 | 0.05 | 0.01 | 0.08 | 0.02 | 0.59 |
| 10% aq sodium | | | | | | | | |

Table 1-continued

|  | EXAMPLE |  |  |  |  |  |  | CONTROL |
|---|---|---|---|---|---|---|---|---|
|  | 1 | 2 | 3 | 4 | 5 | 6 | 7 | bisphenol A modified polyester |
| hypochlorite sol. | 0.02 | 0.03 | −0.05 | 0.04 | 0.03 | 0.03 | 0.02 | 0.33 |
| Xylene | −0.02 | −0.03 | 0.01 | −0.03 | 0.001 | −0.05 | −0.15 | 0.28 |

Note :
*The determination of the gel time was carried out in accordance with the SPI Method, using 0.4 weight part of 6% cobalt naphthenate and 1.0 weight part of methyl ethyl ketone peroxide per 100 weight parts of the resin.
**The cured product specimen used in the tests for the heat distortion temperature, the flexural strength and the chemical resistance was one prepared by adding 0.4 weight part of 6% cobalt naphthenate and 1.0 weight part of methyl ethyl ketone peroxide to 100 weight parts of the resin followed by curing the product by allowing it to stand for 16 hours at room temperature (25°C.) and then for a further 3 hours at 110°C.

EXAMPLES 8 – 11

The oligopolyester glycols obtained in Reference Experiments 6 and 7 were added as indicated in Table 2 to the several kinds of diacrylates and dimethacrylates of epoxy compounds obtained in Reference Experiments 1 – 4, following which the respective polymerizable vinyl monomers used during the preparation of the diacrylates or dimethacrylates were further added to the several mixtures in an amount such that the solids content of the mixtures relative to these oligopolyester glycols would become 60%. This was followed by adding dropwise to the mixture a 60 weight % polymerizable vinyl monomer solution of tolylene diisocyanate during a one hour-period, after which the reaction (courethane reaction) was carried out for the periods of time prescribed in Table 2 to obtain polymerizable vinyl monomer solutions of unsaturated polyurethane resins.

The reaction conditions and the properties of the resulting resinous solutions as well as the properties of the cured product are shown in Table 2. By way of comparison, the properties of a control sample are also shown in the same table.

Table 2

|  | Example |  |  |  | control |
|---|---|---|---|---|---|
|  | 8 | 9 | 10 | 11 | dimethacrylate of an epoxy compound |
| 1 Diacrylate or di dimethacrylate component used | Dimethacrylate of Reference Experiment 1 | Dimethacrylate of Reference Experiment 2 | Dimethacrylate of Reference Experiment 3 | Dimethacrylate of Reference Experiment 4 |  |
| 2 Oligopolyester glycol used | Obtained in Reference Exp. 6 | Obtained in Reference Exp. 7 | Obtained in Reference Exp. 6 | Obtained in Reference Exp. 7 |  |
| 1/2 mole ratio | 7/3 | 7/3 | 6/4 | 5/5 |  |
| Hydroxyl groups/ isocyanate group mole ratio | 0.6 | 0.8 | 0.9 | 0.7 |  |
| Reactions temperature (°C) | 50 | 50 | 60 | 60 |  |
| Reaction time (hrs) | 4.5 | 3 | 5 | 3.5 |  |
| Viscosity of product solution (cps) | 340 | 590 | 980 | 580 |  |
| Gel time of product (min.)* | 1.5 | 2.0 | 1.0 | 3.5 | 12 |
| Heat distortion temperature (°C)** | 125 | 131 | 120 | 102 | 115 |
| Flexural strength (kg/mm²)** | 14.3 | 15.0 | 13.5 | 16.1 | 9.8 |
| Chemical resistance of cured product** Swelling rate (%) after [23° × 30 days] |  |  |  |  |  |
| 20% HCl | −0.05 | 0.02 | 0.08 | −0.31 | 0.35 |
| 20% ag. NaOH | 0.08 | 0.10 | 0.07 | 0.12 | 0.41 |
| 25% ag. H₂SO₄ | 0.41 | 0.03 | 0.12 | 0.49 | 0.31 |
| methyl ethyl ketone | 0.42 | 0.12 | 0.18 | 0.81 | 0.95 |
| styrene | 0.08 | 0.09 | 0.05 | 0.03 | 0.31 |
| 25% ag. acetic acid | 0.04 | 0.01 | 0.03 | 0.01 | 0.42 |
| 10% ag. sodium hydrochlorite solution | 0.01 | 0.03 | 0.01 | 0.02 | 0.05 |
| xylene | −0.05 | 0.08 | 0.10 | −0.08 | 0.02 |

Note:
* as in Table 1.
** as in Table 1.

EXAMPLE 12

180 Grams of a 60 weight % styrene solution of the diethylene glycol addition product of tolylene diisocyanate obtained in Reference Experiment 8 was added dropwise to 500 grams of a 60 weight % styrene monomer solution of a dimethacrylate of an epoxy compound obtained in Reference Experiment 1 during a period of one hour. The reaction was thus carried out to obtain a light yellow resinous solution of a viscosity of 150 centipoises at 25°C.

When one weight part of methyl ethyl ketone peroxide and 0.4 weight part of 6% cobalt naphthenate were added to the so obtained resinous solution and the mixture was cured, there was obtained an extremely tough cured product having a heat distortion temperature and a flexural strength of respectively 110°C. and 18.5 kg/mm².

EXAMPLE 13

260 Grams of a 60 weight % styrene solution of a dimethacrylate of an epoxy compound obtained in Reference Experiment 2 and 210 grams of a 60 weight % styrene solution of the dipropylene glycol-xylylene diisocyanate adduct obtained in Reference Experiment 9 were reacted as in Example 12 to obtain a light yellow resinous solution having a viscosity of 210 centipoises at 25°C.

When one weight part of methyl ethyl ketone and 0.4 weight part of 6% cobalt naphthenate were added to the so obtained resinous solution and the mixture was cured, an extremely tough cured product having a heat distortion temperature and a flexural strength of respectively 130°C. and 17.8 kg/mm² was obtained.

EXAMPLE 14

The dimethacrylate of an epoxy compound obtained in Reference Experiment 1 was admixed with the oligopolyester glycol obtained in Reference Experiment 10 in an amount such that the mole ratio of the former to the latter would become 7/3, following which these polyester glycols were dissolved by the addition of monomeric styrene in an amount such that the solids content of the solution would become 60%.

The urethane reaction was then carried out by adding to the so prepared styrene monomer solution of polyester glycols at 50°C. a 60 weight % styrene solution of tolylene diisocyanate in an amount such that the content of the isocyanate groups would become 60% of the total hydroxyl groups. There was obtained an unsaturated polyurethane resin solution having an acid value of 0.2 and a viscosity of 340 centipoises.

EXAMPLE 15

Monomethyl maleate was added to the several unsaturated polyurethane resin solutions obtained in Examples 1, 2 and 14 in amounts such that acid values of the resinous solutions ranging incrementally from 0 to 20 would be obtained, followed by the addition further of 500 ppm of hydroquinone and thorough stirring. These solutions were each then placed in round cans of 1-kg capacity, sealed and held in a chamber with a thermostat 25°C. The formation of gelled matter at the bottom of the cans was checked once daily with a glass rod, and the number of days that elapse before gelled matter sticks on the glass rod was observed with the results shown in Table 3.

As control, the same test was carried out on a sample consisting of the resin obtained in Reference Experiment 1, which was treated in the same manner as hereinabove described, except that methacrylic acid was added to the resin.

Table 3

| Sample | Number of days that elapse before gelled matter forms Acid Value | | | | |
|---|---|---|---|---|---|
|  | 0 | 5 | 10 | 13 | 20 |
| The resinous solution of Example 1 | less than 1 day | 7 days | 40 days | 63 days | 70 days |
| The resinous solution of Example 2 | '' |  | 10 | 45 | 64 | 73 |
| The resinous solution of Example 14 | '' | 5 | 33 | 55 | 65 |

Table 3 -continued

| Sample | Number of days that elapse before gelled matter forms Acid Value | | | | |
|---|---|---|---|---|---|
|  | 0 | 5 | 10 | 13 | 20 |
| Control | '' | 3 | 18 | 25 | 31 |

EXAMPLE 16

Monomethyl itaconate was added to the several unsaturated polyurethane resin solutions obtained in Example 1, 2 and 14 in amounts such that acid values of the resinous solutions ranging gradationally from 0 – 20 would be obtained, followed by the addition further of 50 ppm of hydroquinone and thorough stirring. The storage test was conducted on these mixtures as in Example 15.

Separately as control, the same storage test as that described above was carried out on a sample treated in like manner by the addition of acrylic acid to the unsaturated polyurethane resin solution obtained in Example 2. The results obtained in this case are also shown in Table 4 by way of comparison.

When acetic acid was used instead of acrylic acid, the curing characteristic of the resin was adversely affected, and only cured products whose properties were poor could be obtained.

Table 4

| Sample | Number of days that elapse before gelled matter forms Acid value | | | | |
|---|---|---|---|---|---|
|  | 0 | 5 | 10 | 15 | 20 |
| The resinous solution of Example 1 | less than 1 day | 6 days | 35 days | 62 days | 65 days |
| The resinous solution of Example 2 | '' | 8 | 46 | 70 | 70 |
| The resinous solution of Example 14 | '' | 5 | 25 | 50 | 55 |
| Control | '' | 2 | 15 | 18 | 33 |

What is claimed is:

1. A process for preparing an unsaturated polyurethane resin containing two or more unsaturated monobasic acid residues selected from the group consisting of acrylic acid and methacrylic acid in its molecular structure which comprises reacting, in the presence of a polymerizable vinyl monomer other than acrylic or methacrylic acid, (A) a diesterified epoxy compound containing at least two hydroxyl groups, said compound obtained by reacting an epoxy compound having two epoxy groups in its molecular structure but not containing a hydroxyl group with unsaturated monobasic acid selected from the group consisting of acrylic acid and methacrylic acid, with (B) a diisocyanate compound in the presence or absence of (C) an oligopolyester glycol containing a saturated or unsaturated dibasic acid group, at the rate of 0.2 to 1.0 mole of the isocyanate group per each mole of said hydroxyl group and adding (D) a monoalkyl ester of an unsaturated dibasic acid in the final reaction product unsaturated polyurethane solution in such amount that the acid value of said solution is at least 5.

2. The method of claim 1 wherein (B) said monoalkyl ester of an unsaturated dibasic acid, is monomethyl maleate.

3. The process of claim 1 which includes the presence of said component (C) wherein said oligopolyester glycol is selected from the reaction product between phthalic anhydride and ethylene glycol or fumaric acid and neopentyl glycol.

* * * * *